United States Patent [19]

Wang

[11] Patent Number: 5,713,646
[45] Date of Patent: Feb. 3, 1998

[54] DAUGHTER WARDROBE ADAPTED FOR USE INSIDE A MOTHER WARDROBE

[76] Inventor: Wen-Tsan Wang, P.O. Box 82-144, Taipei, Taiwan

[21] Appl. No.: 766,484

[22] Filed: Dec. 13, 1996

[51] Int. Cl.⁶ ............................................. B65D 85/18
[52] U.S. Cl. ........................ 312/3; 312/6; 206/292; 206/286; 206/288
[58] Field of Search ........................ 312/3, 4, 5, 6; 248/214, 201; 206/282, 289, 298, 292, 290, 286, 297, 288; 211/119, 117, 124

[56] References Cited

U.S. PATENT DOCUMENTS

| | | | |
|---|---|---|---|
| 1,363,726 | 12/1920 | Gadomski | 206/289 |
| 1,805,877 | 5/1931 | Lichtig | 312/6 X |
| 1,895,208 | 1/1933 | Salavsky | 206/292 X |
| 1,958,230 | 5/1934 | Blechman | 206/289 X |
| 2,039,823 | 5/1936 | Miller | 312/3 X |
| 2,293,625 | 8/1942 | Patch | 312/6 X |
| 2,351,882 | 6/1944 | Schwartzman | 312/6 X |
| 2,440,192 | 4/1948 | Cowan | 312/6 |
| 2,526,385 | 10/1950 | Meyer | 206/289 X |
| 3,184,273 | 5/1965 | Blough | 312/6 |

FOREIGN PATENT DOCUMENTS 222520  10/1942  Switzerland .................... 206/289

*Primary Examiner*—Peter M. Cuomo
*Assistant Examiner*—Janet M. Wilkens
*Attorney, Agent, or Firm*—A & J

[57] ABSTRACT

A daughter wardrobe adapted for use inside a mother wardrobe for holding clothes, including a wardrobe body and a supporting frame mounted inside the wardrobe body to stretch out and support a top panel of the wardrobe body, wherein a plurality of loops are respectively fastened to the top panel of the wardrobe body on the inside and arranged in a line in transverse direction to hold a hanging rod for hanging clothes. A reinforcing plate maybe mounted inside the wardrobe body and closely attached to the top panel thereof, and a cloth rack is riveted to the reinforcing plate for hanging clothes.

1 Claim, 3 Drawing Sheets

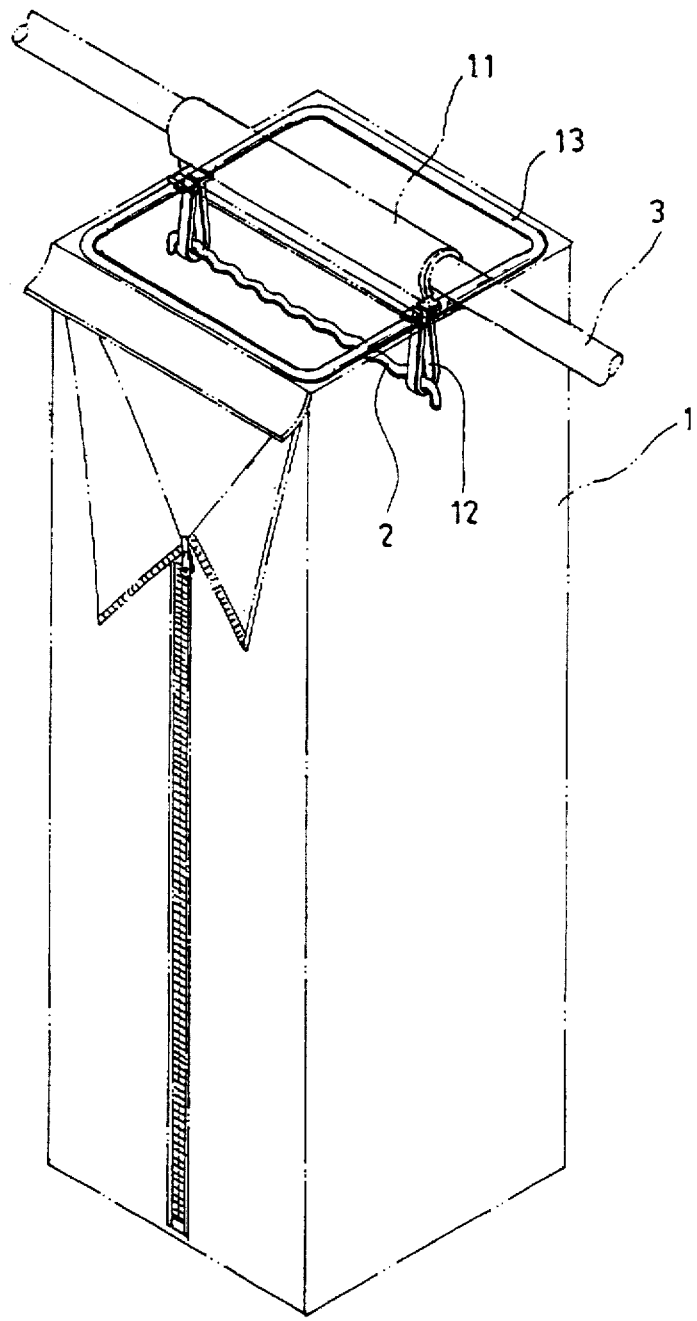
F I G. 1

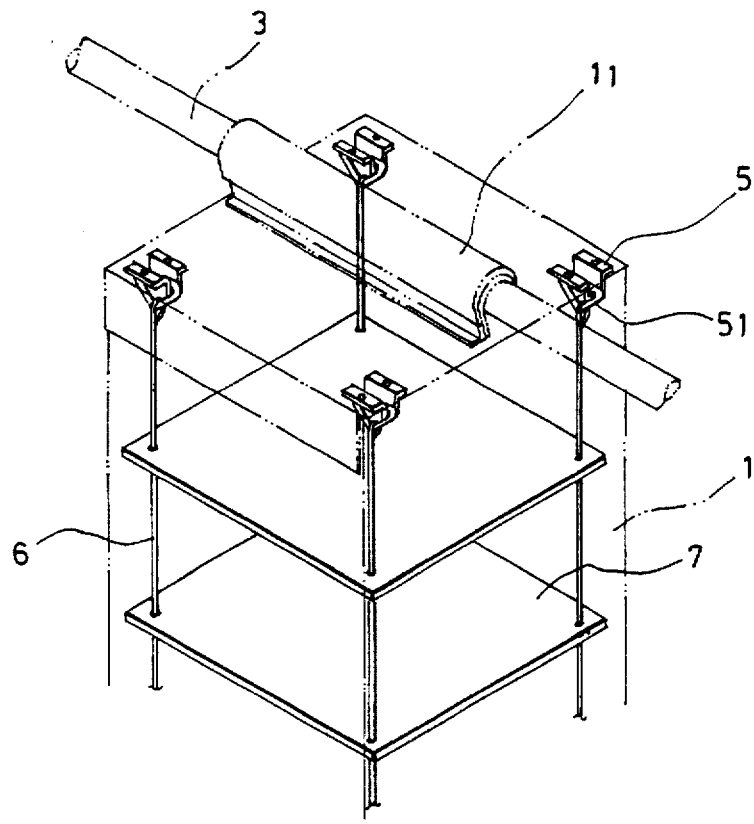
F I G. 4
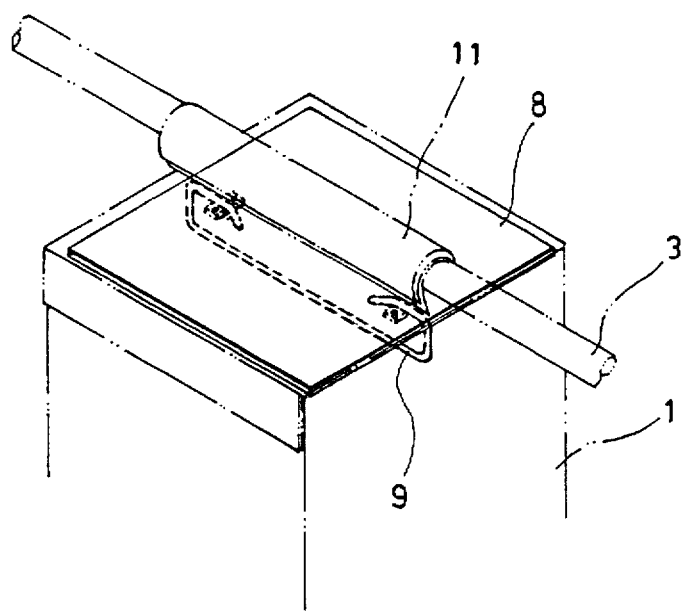
F I G. 5

DAUGHTER WARDROBE ADAPTED FOR USE INSIDE A MOTHER WARDROBE

BACKGROUND OF THE INVENTION

The present invention relates to a daughter wardrobe adapted for use inside a mother wardrobe, and more particularly to such a daughter wardrobe which comprises a line of loops fastened to the top panel of the wardrobe body to hold a hanging rod for hanging clothes.

Various daughter wardrobes have been disclosed for use inside mother wardrobes for holding clothes. These daughter wardrobes are commonly comprised of a wardrobe body made from plastic, a supporting frame mounted inside the wardrobe body to stretch out the wardrobe body into shape, and a plurality of partition plates mounted inside the wardrobe body at different elevations for holding clothes. These daughter wardrobes have little space for means for hanging clothes in shape.

SUMMARY OF THE INVENTION

The present invention provides a daughter wardrobe which has hanging means for hanging clothes in shape. According to one embodiment of the present invention, a plurality of loops are respectively fastened to the top panel of the wardrobe body on the inside and arranged in a line in transverse direction, and a handing rod is supported on the loops for hanging clothes. The loops can be fastened to the wardrobe body or a supporting member inside the wardrobe body by ultrasonic welding, stitches, or rivets. According to an alternate form of the present invention, a reinforcing plate is mounted inside the wardrobe body and closely attached to the top panel thereof, and a cloth rack is riveted to the reinforcing plate for hanging clothes.

BRIEF DESCRIPTION OF THE DRAWINGS

FIG. 1 is a perspective view of a daughter wardrobe according to a first embodiment of the present invention, showing two loops welded to a supporting frame inside the wardrobe body, and a hanging rod supported on the loops for hanging clothes;

FIG. 4 is a perspective view of a part of a daughter wardrobe according to a fourth embodiment of the present invention, showing a plurality of ropes suspended from U-mounts inside the wardrobe body, and a plurality of partition plates horizontally fastened to the ropes at different elevations; and FIG. 5 is a perspective view of a part of a daughter wardrobe according to a fifth embodiment of the present invention, showing a cloth rack riveted to a reinforcing plate inside the wardrobe body at the top.

DETAILED DESCRIPTION OF THE PREFERRED EMBODIMENT

Figure 2:
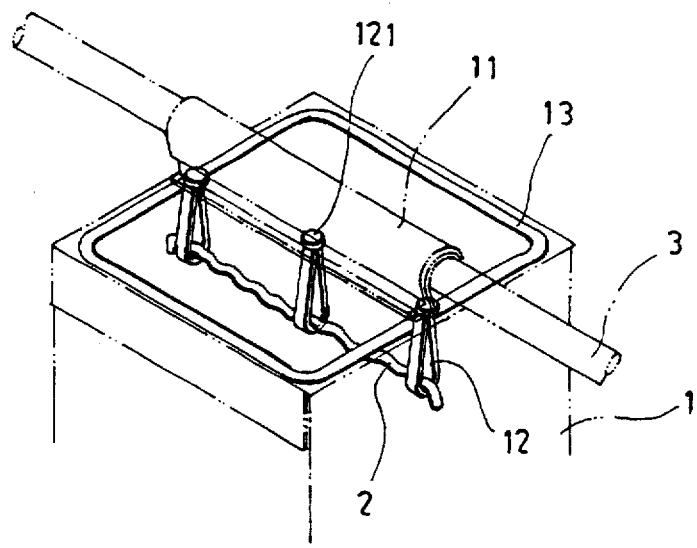
FIG. 2 is a perspective view of a part of a daughter wardrobe according to a second embodiment of the present invention, showing a plurality of loops riveted to the top panel of the wardrobe body, and a hanging rod supported on the loops for hanging clothes.

Referring to FIG. 1, a daughter wardrobe in accordance with the present invention is generally comprised of a wardrobe body 1, a supporting frame 13 mounted inside the wardrobe body 1 at the top to stretch out the top of the wardrobe body 1. The supporting frame 2 is preferably made from a metal wire rod, having a profile fitting the cross section of the wardrobe body 1, so that the wardrobe body 1 is stretched into shape when the supporting frame 2 is installed. The wardrobe body 1 is made from plastic and adapted for holding clothes, having a zip fastener at the front side through which the wardrobe 1 is openably closed and a transverse front flap at the top which covers the top gap in the front side of the wardrobe 1. A transverse sleeve 11 is fixedly fastened to the top of the wardrobe body 1 on the inside, and a cross bar 3 is inserted through the transverse sleeve 11 and holes (not shown) in two opposite side panels of the wardrobe body 1 for hanging the wardrobe body 1 inside a mother wardrobe (not shown).

Referring to FIG. 1 again, a plurality of loops 12 are fastened to the top of the wardrobe body 1 on the inside by ultrasonic welding or stitches, and arranged in a line in transverse direction to hold a hanging rod 2 for hanging clothes.

FIG. 2 shows an alternate form of the present invention, in which a plurality of loops 12 are respectively fastened to the top of the wardrobe body 1 by rivets 121 and arranged in a line in transverse direction to hold a hanging rod 2 for hanging clothes.

Figure 3:
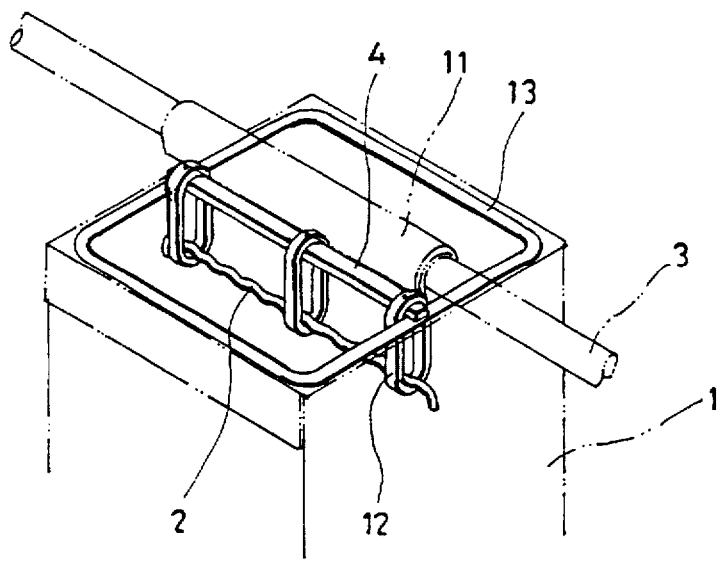
FIG. 3 is a perspective view of a part of a daughter wardrobe according to a third embodiment of the present invention, showing a plurality of loops riveted to a cross beam inside the wardrobe body, and a hanging rod supported on the loops for hanging clothes.

FIG. 3 shows another alternate form of the present invention, in which a cross beam 14 is fastened to the supporting frame 13, and a plurality of loops 12 are respectively riveted to a cross beam 4 to hold a hanging rod 2 for hanging clothes.

FIG. 4 shows still another alternate form of the present invention. According to this alternate form, a plurality of U-mounts 5 are fixedly fastened to the top of the wardrobe body 1 on the inside, a plurality of hanging rings 51 are respectively mounted on the U-mounts 5, and a plurality of ropes 6 are suspended from the hanging rings 51 to hold a plurality of partition plates 7 at different elevations. The partition plates 7 can be fixed to the ropes 6 at the desired elevations by for example, inserting the ropes 6 through respective through holes in the partition plates 7 and tying each rope 6 in a knot below each partition plate 7.

FIG. 5 shows still another alternate form of the present invention. According to this alternate form, a reinforcing plate 8 is mounted inside the wardrobe body 1 at the top above the sleeve 11, and a cloth rack 9 is riveted to the reinforcing plate 8 for hanging clothes.

It is to be understood that the drawings are designed for purposes of illustration only, and are not intended as a definition of the limits and scope of the invention disclosed.

What the invention claimed is:

1. A daughter wardrobe adapted for use inside a mother wardrobe for holding clothes, comprising:

a wardrobe body;

a plurality of U-mounts fixedly fastened to a top panel of said wardrobe body on the inside;

a plurality of hanging rings respectively mounted on said U-mounts; and a plurality of ropes suspended from said hanging rings to hold a plurality of partition plates inside said wardrobe body at different elevations for holding clothes.

* * * * *